3,086,003
QUATERNIZED IMIDAZOLE AZO BENZENE DYESTUFFS CONTAINING A PIPERAZINE SUBSTITUENT

Hans Baumann and Johannes Dehnert, Ludwigshafen (Rhine), Germany, assignors to Badische Anilin- & Soda-Fabrik Aktiengesellschaft, Ludwigshafen (Rhine), Germany
No Drawing. Filed Oct. 25, 1960, Ser. No. 64,741
Claims priority, application Germany Oct. 29, 1959
6 Claims. (Cl. 260—146)

This invention relates to new basic azo dyes, a process for their production and their use for dyeing textile materials.

In our copending U.S. patent application Serial No. 821,644 (filed June 22, 1959), we have described dyes of the general formula:

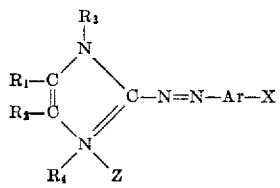

(I)

in which $R_1$ and $R_2$ represent hydrogen atoms, alkyl, cycloalkyl, aralkyl and/or aryl radicals or members of a common non-aromatic isocyclic or heterocyclic ring, $R_3$ and $R_4$ represent alkyl, cycloalkyl or aralkyl groups, Ar represents an o-phenylene, p-phenylene, o-naphthylene or p-naphthylene group which may be substituted, or the divalent radical of 4,4′-azobenzene, and X represents a halogen atom, an alkoxy, alkylmercapto, alkylsulfonic acid ester or arylsulfonic acid ester group or a radical of the general formula:

(II)

(in which $R_5$ represents a hydrogen atom, an alkyl, hydroxyalkyl, cycloalkyl or aralkyl group, $R_6$ represents an alkyl or aryl group, and $R_5$ and $R_6$ may be members of a common heterocyclic ring), and Z represents the equivalent of an anion.

It is an object of the present invention to provide new dyes which do not change their shade upon the addition of acids and which are eminently suitable for dyeing or printing textile materials of wool, silk, synthetic linear polyamides, synthetic linear polyurethanes, mordanted or unmordanted cellulose, cellulose esters, linear fiber-forming polyesters or acrylonitrile-containing polymers as well as leather.

The term "textile materials" includes fibers, flock, filaments, threads, woven and non-woven fabrics. "Synthetic linear polyamides" include nylon 6, nylon 66 and nylon 11; the term "cellulose" includes native cellulose, such as cotton, and regenerated cellulose, such as rayon and rayon staple; "cellulose esters" include cellulose 2½-acetate and cellulose triacetate; "linear fiber-forming polyesters" include for example, polyethylene terephthalate; "acrylonitrile-containing polymers" include, for example, polyacrylonitrile and copolymers of acrylonitrile and other polymerizable compounds, such as vinyl acetate, vinyl chloride or vinylidene chloride, the dyeing characteristics of the copolymers being determined by the acrylonitrile content. Such copolymers preferably contain 40% or more by weight of acrylonitrile.

The said textile materials can be dyed by means of dyebaths, padding solutions or printing pastes which contain the new dyes which will be described in greater detail below. As far as the said materials are obtained industrially by a spinning process, they may also be spindyed with the new dyes.

Another object of this invention is to provide a process for the production of the new dyes according to this invention.

The new dyes according to this invention have the general formula:

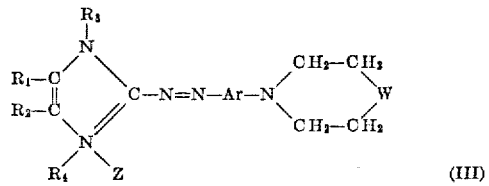

(III)

in which $R_1$, $R_2$, $R_3$, $R_4$, Ar and Z have the meanings given above and W represents one of the radicals of the general formulae:

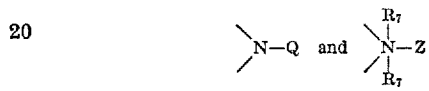

in which Q represents an acyl or sulfonyl radical, a negatively substituted aryl radical, a triazinyl radical which may be substituted, or one of the radicals:

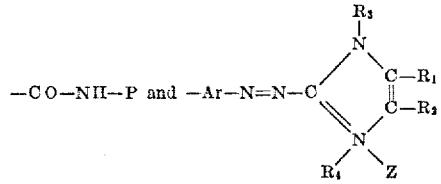

(P representing an aryl radical which may be substituted), and $R_7$ represents an alkyl, cycloalkyl or aralkyl radical.

The new dyes according to this invention are obtained by reacting dyes of the general formula:

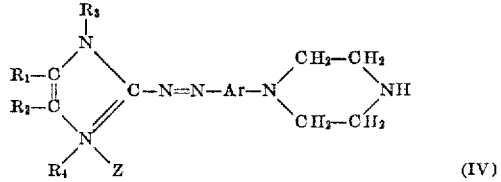

(IV)

with acylating, sulfonylating, alkylating, cycloalkylating or aralkylating agents, negatively substituted aryl halides, halogentriazines or arylisocyanates which may be substituted, or dyes of the general Formula I in which X represents a halogen atom, an alkoxy, alkylmercapto, alkylsulfonic acid ester or arylsulfonic acid ester group.

Dyes of the general Formula IV are prepared, for example, by the process described in our copending U.S. patent application Serial No. 821,644. The method of production is described again in Example 1 below.

Suitable acylating agents include carboxylic acid anhydrides, such as acetic anhydride, carboxylic acid halides, such as acetyl chloride, propionyl chloride, butyryl chloride, chloracetyl chloride, β-chlorpropionyl chloride, dimethylcarbamic acid chloride, benzoyl chloride and chloroformic acid ethyl ester, and isocyanates, such as phenyl isocyanate.

Suitable sulfonylating agents include sulfonic acid halides, such as methanesulfonic acid chloride, benzenesulfonic acid chloride, methylbenzenesulfonic acid chloride, chlorbenzenesulfonic acid chloride and diethylsulfaminic acid chloride.

Compounds suitable for the introduction of alkyl, cycloalkyl or aralkyl radicals include alkyl, aralkyl and cycloalkyl halides, such as methyl chloride, ethyl bromide, cyclohexyl bromide, benzyl chloride and phenacyl chloride, as well as dialkyl sulfates and alkyl esters of aromatic sulfonic acids, such as dimethyl sulfate, diethyl sulfate, methylbenzenesulfonic acid methyl ester and methylbenzenesulfonic acid-(2-chlorethyl) ester.

Compounds suitable for the introduction of aromatic radicals include negatively substituted halogenaryl compounds whose halogen atoms are readily reacted with amino groups, such as 2,4-dinitro-1-chlorbenzene, 2,4-dinitro-1-fluorobenzene and 3-nitro-4-chlorbenzenesulfonic acid dimethylamide.

Suitable halogentriazines include trichlortriazine and 2-phenyl-4,6-dichlor-1,3,5-triazine.

Reaction of the initial dyes with the said compounds is preferably carried out in water or in mixtures of water and organic liquids. Depending on the reactivity of the initial materials, it is recommendable to carry out the reaction with cooling, at room temperature or at an elevated temperature. It is of advantage in most cases to add acid-binding agents, such as magnesium oxide, sodium acetate, sodium carbonate and, if desired, also tertiary amines, such as pyridine and triethylamine.

Suitable organic liquids include acetone, dioxane, tetrahydrofurane, formamide and dimethylformamide.

If the groups introduced at the piperazine radical of the initial dyes still contain radicals which, under the prevailing dyeing or printing conditions, are capable of forming covalent bonds with fibers containing hydroxy or amino groups (such as cotton, wool or polyamides), especially wash-fast dyeings are obtained.

Of the new dyes according to this invention, those are especially preferred which have the general formula:

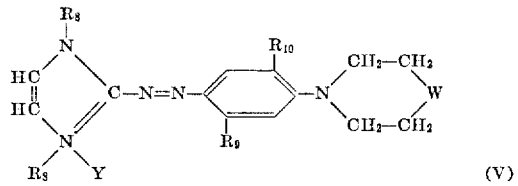

in which $R_8$ represents a lower alkyl radical, such as a methyl or ethyl radical, $R_9$ and $R_{10}$ represent hydrogen atoms, halogen atoms, such as chlorine atoms, lower alkyl radicals, such as methyl or ethyl radicals, or lower alkoxy radicals, such as methoxy or ethoxy radicals, Y represents the equivalent of an anion, and W represents one of the radicals of the general formulae:

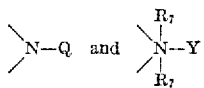

in which Q represents a radical of a low molecular weight aliphatic monocarboxylic acid, such as an acetyl, chloracetyl, trichloroacetyl or β-chloropropionyl radical, a radical of a substituted or non-substituted benzenecarboxylic or benzenesulfonic acid, such as a benzoyl, 4-chlorbenzoyl, benzenesulfonyl, 4-chlorbenzenesulfonyl, o-toluenesulfonyl or p-toluenesulfonyl radical, a 2,4-dinitrophenyl or 4,6-dichlor-1,3,5-triazinyl-(2) radical or one of the radicals:

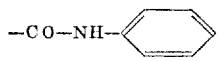

and

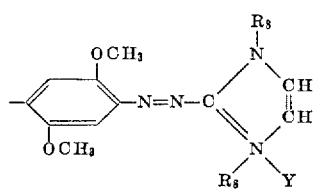

and $R_7$ represents a lower alkyl radical, such as a methyl or ethyl radical.

Suitable anions include inorganic and organic anions, for example halogen anions, such as fluoride, chloride, bromide and iodide anions, anions derived from sulfonic acid and its organic derivatives, such as sulfate, bisulfate, benzene sulfonate, toluene sulfonate and methane sulfonate anions, anions derived from carboxylic acids, such as acetate, trichloracetate and oxalate anions, and anions derived from other inorganic acids, such as nitrate, perchlorate, tetrafluoborate and tetrachlorozincate anions.

The said especially preferred new dyes are prepared for example, in the manner described above by using as initial materials dyes of the formula:

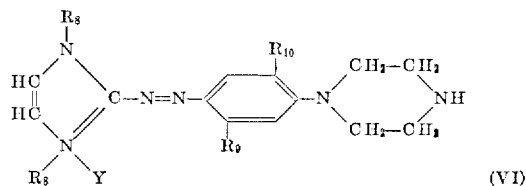

in which $R_8$, $R_9$, $R_{10}$ and Y have the meanings given above.

The following examples will further illustrate this invention, but the invention is not restricted to these examples. Unless otherwise specified, the parts and percentages specified in the examples are by weight. The ratio of parts by volume to parts by weight is that of the liter to the kilogram under normal conditions.

*Example 1*

250 parts by volume of an 0.2 M aqueous solution of a dye of the formula:

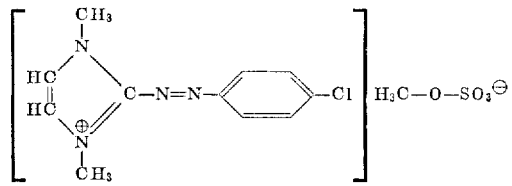

are introduced while stirring into a solution of 43 parts of piperazine in 250 parts of water in the course of one hour at 40° to 50° C. The mixture is stirred until initial dye can no longer be detected chromatographically. Then 3000 parts of 3% acetic acid are added to the mixture, and the dye formed is precipitated with 800 parts of sodium chloride and 100 parts by volume of a 50% aqueous zinc chloride solution. The dye is then filtered off, washed with 250 parts of a half-saturated sodium chloride solution and dried at 70° C.

To a solution of the whole of the dye obtained in 1000 parts of water, there are added 10 parts of magnesium oxide and, in the course of 30 to 40 minutes at 0° to 5° C., 40 parts by volume of dimethyl sulfate. The mixture is stirred at the same temperature for several hours until methylation is complete. Then 1000 parts of 3% acetic acid are added, the dye formed is precipitated with 400 parts of sodium chloride and 100 parts by volume of a 50% aqueous zinc chloride solution, washed with 250 parts of a half-saturated aqueous sodium chloride solution and dried at 70° C. The dye which is obtained in the form of an orange powder has the following formula:

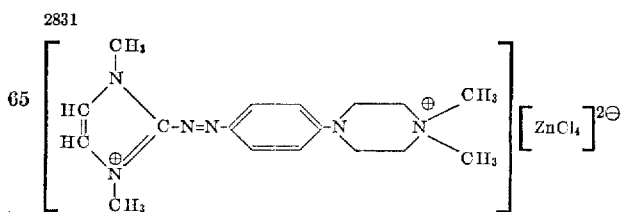

A fabric of polyacrylonitrile staple fiber is placed, at 60° C., in a dyebath of 5 parts of 30% aqueous acetic acid, 10 parts of sodium sulfate, 0.6 part of the said dye and 4000 parts of water. The temperature of the bath is raised to 85° C. in the course of 15 minutes. The bath is then brought to the boil within 30 minutes and dyeing continued for 90 minutes in the boiling bath. The fabric is then soaped, rinsed and dried. The fiber is dyed an orange shade of excellent fastness to washing and fulling and of very good light fastness.

A dye with similar properties is obtained by using diethyl sulfate instead of dimethyl sulfate. By using 500 parts of a 1 M aqueous solution of sodium perchlorate or sodium tetrafluoborate instead of the above-mentioned zinc chloride/sodium chloride solution, the perchlorates or tetrafluoborates of the said dyes are obtained.

*Example 2*

100 parts by volume of a 50% aqueous sodium acetate solution and 1000 parts by volume of acetone are added to a solution of the whole of the dye prepared as described in the first paragraph of Example 1 in 1000 parts of water. 11 parts of 2,4-dinitro-1-chlorobenzene, dissolved in 100 parts by volume of acetone, are added to the mixture within 30 minutes at 40° to 50° C. The whole is stirred at 40° to 50° C. until the reaction is completed. The dye formed is precipitated with 1000 parts by volume of a saturated aqueous sodium chloride solution, filtered off, washed with 250 parts of a half-saturated aqueous sodium chloride solution and dried at 70° C. The dye is obtained in the form of a brown-red powder which dissolves in hot water with a red color and dyes fabrics of a copolymer derived from 85 parts of acrylonitrile and 15 parts of vinyl acetate red shades of excellent wet fastness.

*Example 3*

A solution of 19 parts of trichlortriazine in 100 parts of acetone is allowed to flow into a mixture of 250 parts of water and 250 parts of ice within 20 minutes. A solution of the whole of the dye obtained as described in the first paragraph of Example 1 in 500 parts of water is added to this suspension in the course of 30 minutes at 0° to 5° C. Then 80 parts by volume of a 10% aqueous sodium carbonate solution are slowly added. The mixture is stirred for two hours at the same temperature, the dye formed is filtered off, washed with a small amount of cold water and dried at 40° C. under reduced pressure. The dye is obtained in the form of a dark red powder which dissolves in water with a red color and dyes acrylonitrile yarn fast red shades.

A cotton fabric is padded with an aqueous solution of the said dye which contains sodium hydrogen carbonate. The fabric is then treated for five minutes with hot air of 140° C. After removal of the portion of the dye which has not been fixed by soaping, a red dyeing of excellent fastness to washing is obtained.

*Example 4*

10 parts of phenyl isocyanate and then 40 parts by volume of a 10% aqueous sodium carbonate solution are allowed to flow, at 0° to 5° C., into a solution of the whole of the dye obtained as described in the first paragraph of Example 1 in a mixture of 1000 parts of water and 1000 parts of acetone. After the reaction has ended, the mixture is diluted with 4000 parts of water, heated to 60° to 70° C. and filtered while hot. After acidification with 25 parts of 30% acetic acid, the dye is separated from the filtrate by adding 400 parts of sodium chloride and 50 parts of a 50% aqueous zinc chloride solution, washed with half-saturated aqueous sodium chloride solution and dried at 70° C. The dark red powder obtained dissolves in hot water with a red color and dyes polyacrylonitrile fibers red shades of very good light fastness and excellent wet fastness.

The iodide or nitrate of the said dye is obtained by using 500 parts of an aqueous 1 M solution of sodium nitrate or sodium iodide, instead of the said sodium chloride/zinc chloride solution, for precipitation.

*Example 5*

100 parts by volume of a 50% aqueous sodium acetate solution are added to a solution of the whole of the dye prepared as described in the first paragraph of Example 1 in a mixture of 1000 parts of water and 1000 parts of acetone. Then 15 parts of benzoyl chloride are added in the course of 20 minutes at 0° to 5° C. After stirring for several hours, 50 parts of a 25% aqueous ammonia solution and then 2000 parts by volume of a saturated aqueous sodium chloride solution are added to the reaction mixture. The deposited dye is filtered off, washed with 250 parts by volume of a half-saturated aqueous sodium chloride solution and dried at 70° C. The dye is obtained in the form of a dark red powder which dissolves in water with a red color and dyes acrylonitrile-containing polymers red shades of very good light fastness and excellent wet fastness.

100 parts of a fabric of cellulose 2½ acetate are placed in a bath, at 25° C. of 5000 parts of water, 2 parts of the said dye of the formula:

$$\left[ \begin{array}{c} CH_3 \\ | \\ N \\ HC \diagup \quad \diagdown \\ \| \quad \quad C-N=N-\!\!\!\bigcirc\!\!\!-N\!\!\!\bigcirc\!\!\!N-CO-\!\!\!\bigcirc \\ HC \diagdown \overset{\oplus}{\diagup} \\ N \\ | \\ CH_3 \end{array} \right]_2 [ZnCl_4]^{2\ominus}$$

3 parts of 30% aqueous acetic acid and 3 parts of the product obtained by allowing 15 mols of ethylene oxide to act on rosin. The bath temperature is raised to 75° C. within 20 minutes and the bath maintained at this temperature for 40 minutes. A red dyeing with excellent fastness properties is obtained.

By using gas initial material one of the dyes of the formulae:

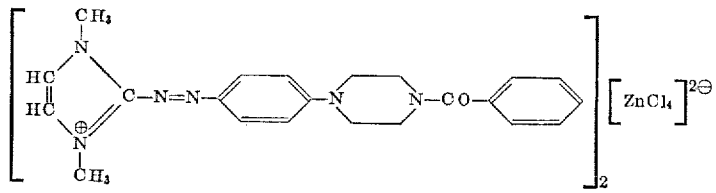

and

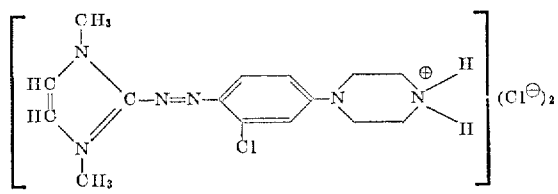

which may be prepared according to the directions given in the first paragraph of Example 1, similar dyes are obtained which dye polyacrylonitrile fabrics fast shades.

Example 6

A solution of 18 parts of benzenesulfonic acid chloride in 100 parts by volume of acetone and, at the same time, 250 parts by volume of a 10% aqueous sodium carbonate solution are allowed to flow, within an hour and at room temperature, into a solution of the whole of the dye prepared as described in the first paragraph of Example 1 in a mixture of 500 parts of water and 500 parts of acetone. The mixture is stirred for several hours at room temperature until initial dye can no longer be detected chromatographically. Then 5000 parts of water are added, the mixture is heated to 80° to 90° C. and filtered while hot. On cooling, a dye of the formula:

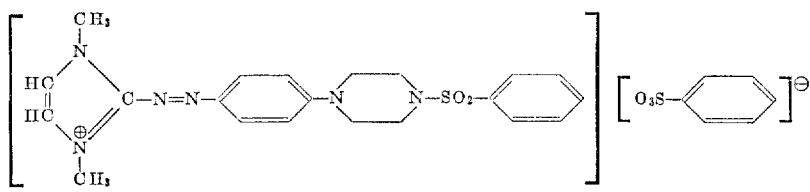

crystallizes from the filtrate in the form of fine small needles which are filtered off, washed with a small amount of cold water and dried at 70° C. The dye dissolves in hot water with a red color.

100 parts of fibers of a copolymer from 40 parts of acrylonitrile and 60 parts of vinyl chloride are dyed at 85° C. in a dyebath of 3000 parts of water, 5 parts of 30% aqueous acetic acid, 3 parts of the condensation product of 1 mol of sperm oil alcohol and 24 mols of ethylene oxide, and 0.4 part of the said dye. The fibrous material is dyed yellowish red; the dyeing exhibits excellent fastness to wet treatment and very good light fastness.

Dyes with similar properties are obtained by using 2-methylbenzenesulfonic acid chloride, 4-methylbenzenesulfonic acid chloride, a mixture of these two compounds, 4-chlorbenzenesulfonic acid chloride, 4-chlorbenzoyl chloride, acetyl chloride, acetic anhydride or trichloracetyl chloride instead of benzenesulfonic acid chloride.

Example 7

The whole of the dye prepared as described in the first paragraph of Example 1 is reacted as described in Example 5, but with 12 parts of chloracetyl chloride instead of with benzoyl chloride. The reaction product is deposited by adding 400 parts of sodium chloride and 70 parts by volume of a 50% aqueous zinc chloride solution. A dye is obtained which dyes polyacrylonitrile fibers fast red shades.

100 parts of woolen yarn are placed in a dyebath of 5000 parts of water, 1.2 parts of the said dye of the formula:

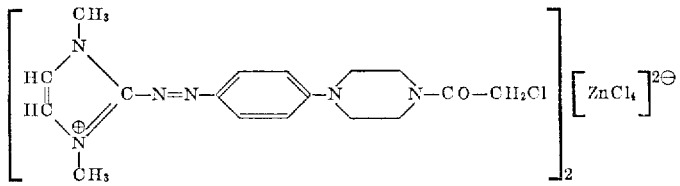

5 parts of 30% aqueous acetic acid, 10 parts of sodium sulfate and 1 part of the sodium sulfonate of the adduct derived from 18 mols of ethylene oxide and 1 mol of sperm oil alcohol. The bath temperature is raised within half an hour from 40° to 100° C., dyeing is continued for 45 minutes at this temperature and the dyed yarn squeezed out. The yarn is then aftertreated for half an hour in a bath of 2000 parts of water and 2 parts of 96% sulfuric acid, squeezed out again and dried. The powerful red dyeing obtained exhibits considerably better wetting properties than a dyeing obtained with the dye which bears an acetyl group instead of the chloracetyl group.

By using 13 parts of 2-chlorpropionyl chloride instead of chloracetyl chloride, a dye with similar properties is obtained which, in the presence of basic-reacting substances, such as sodium hydroxide, potassium hydroxide, sodium carbonate, potassium carbonate or sodium bicarbonate dyes cotton red shades of excellent fastness to washing.

Cotton is padded with an aqueous solution which contains per liter 1 grams of the dye:

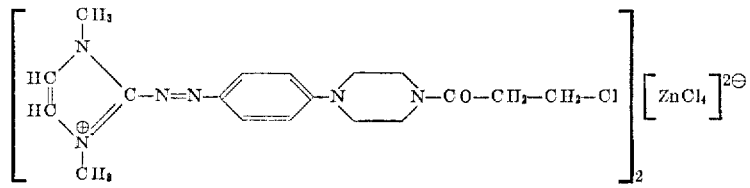

and 20 grams of sodium carbonate, then steamed for 8 minutes at 100° C. and subsequently soaped at the boil. A red dyeing is obtained which exhibits markedly better wetting properties than a dyeing obtained with the dye which bears a propionyl radical instead of the chlorpropionyl radical.

Example 8

Half of the total amount of the dye obtained as described in the first paragraph of Example 1 is stirred with 500 parts of ethanol and 50 parts by volume of a 50% aqueous sodium acetate solution at 40° to 50° C. 18.5 parts of a dye of the formula:

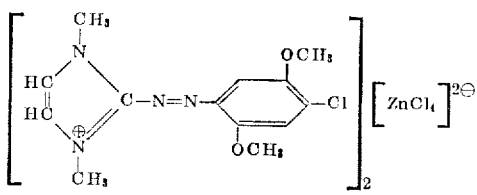

dissolved in 500 parts of ethanol, are added to this paste. The mixture is stirred at the same temperature until the initial dyes can no longer be detected chromatographically. The disazo dye formed is deposited with 3000 parts by volume of a saturated aqueous sodium chloride solution and dried at 70° C. The violet powder obtained dissolves in hot water with a red-violet color and dyes acrylonitrile-containing polymers from an acetic acid bath red-violet shades of very good light fastness and excellent wet fastness.

A dye with similar properties is obtained by using the dye:

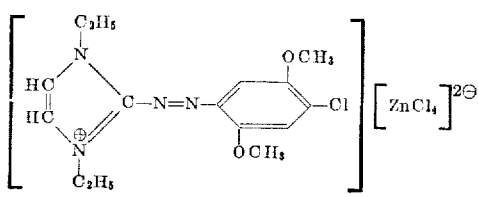

instead of the dye of the formula specified in the first paragraph of this example.

We claim:
1. A dye of the formula:

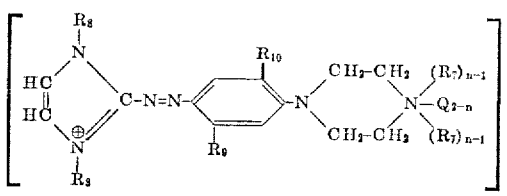

in which
$R_8$ represents a radical selected from the class consisting of methyl and ethyl,
$R_9$ and $R_{10}$ each represents a radical selected from the class consisting of a hydrogen, chlorine, methyl, ethyl and methoxy,
Y represents the equivalent of an anion,
Q represents a radical selected from the class consisting of acetyl, chloracetyl, trichloracetyl, β-chlorpropionyl, benzoyl, 4-chlorbenzoyl, benzenesulfonyl, o-toluenesulfonyl, p-toluenesulfonyl, p-chlorbenzenesulfonyl, 2,4-dinitrophenyl, 4,6-dichlor-1,3,5-triazinyl-(2) and the radical

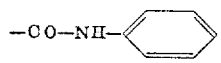

$R_7$ represents a radical selected from the class consisting of methyl and ethyl, and
$n$ represents an integer of from 1 to 2, inclusive.

2. The dye of the formula:

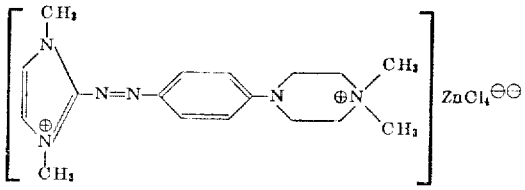

3. The dye of the formula:

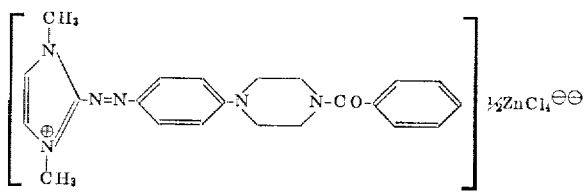

4. The dye of the formula:

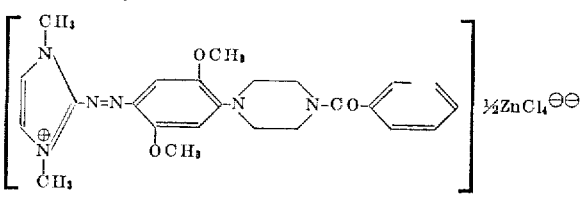

5. The dye of the formula:

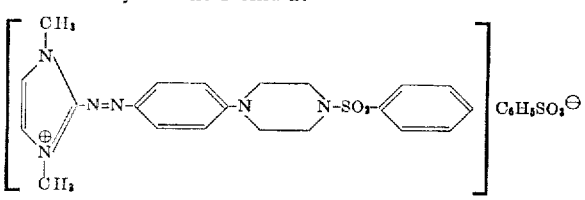

6. The dye of the formula:

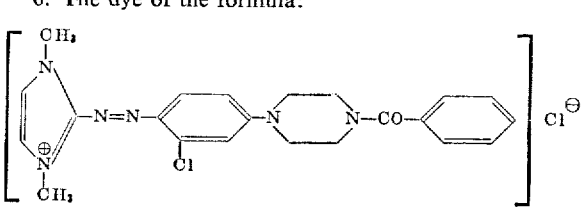

References Cited in the file of this patent
UNITED STATES PATENTS

| | | |
|---|---|---|
| 2,235,480 | Graenacher et al. | Mar. 18, 1941 |
| 2,883,373 | Bossard et al. | Apr. 21, 1959 |

FOREIGN PATENTS

| | | |
|---|---|---|
| 556,218 | Canada | Apr. 22, 1958 |

UNITED STATES PATENT OFFICE
CERTIFICATE OF CORRECTION

Patent No. 3,086,003                                April 16, 1963

Hans Baumann et al.

It is hereby certified that error appears in the above numbered patent requiring correction and that the said Letters Patent should read as corrected below.

Column 6, line 47, for "gas" read -- as --.

Signed and sealed this 24th day of December 1963.

(SEAL)
Attest:

ERNEST W. SWIDER                             EDWIN L. REYNOLDS

Attesting Officer                             Acting Commissioner of Patents